United States Patent
Haar

[19]

[11] Patent Number: 6,052,982
[45] Date of Patent: Apr. 25, 2000

[54] PLAYING FIELD GROOMING RAKE

[76] Inventor: Rudolph Haar, 389 - N. Glynde Avenue, Burnaby, British Columbia, Canada, V5B 1H1

[21] Appl. No.: 09/041,126

[22] Filed: Mar. 12, 1998

[51] Int. Cl.⁷ ..................................................... A01D 7/06
[52] U.S. Cl. ..................................... 56/400.07; 56/400.21
[58] Field of Search ............................ 56/400.21, 400.04, 56/400.05, 400.06, 400.07

[56] References Cited

U.S. PATENT DOCUMENTS

| | | |
|---|---|---|
| 354,355 | 12/1886 | Seatter . |
| 1,138,274 | 5/1915 | Bozarth . |
| 1,191,378 | 7/1916 | Whitaker ........................... 56/400.21 X |
| 1,213,230 | 1/1917 | Mittcovsbe ............................ 56/400.07 |
| 1,276,671 | 8/1918 | Martin ................................. 56/400.05 |
| 1,384,353 | 10/1921 | Reinwald ........................... 56/400.21 X |
| 2,317,916 | 4/1943 | Kallal ..................................... 56/400.1 |
| 3,397,469 | 8/1968 | Browning ..................................... 37/53 |

*Primary Examiner*—H. Shackelford
*Attorney, Agent, or Firm*—Oyen Wiggs Green & Mutala

[57] ABSTRACT

A durable rake specifically designed for grooming playing fields, such as baseball diamonds. The rake may be used to scarify, compact and smooth infield playing surfaces, such as base lines, pitcher's mounds and home plate areas. The rake includes a rigid, elongated grooming member having a flat bottom surface and opposed first and second longitudinal edges. At least the first longitudinal edge is bevelled. A plurality of T-shaped grooming tines are spaced along the length of the second longitudinal edge and project outwardly therefrom. The tines located at end portions of the grooming member project for a shorter distance than the remaining tines to prevent snagging. An elongated handle is securable to a top surface of the grooming member.

9 Claims, 3 Drawing Sheets

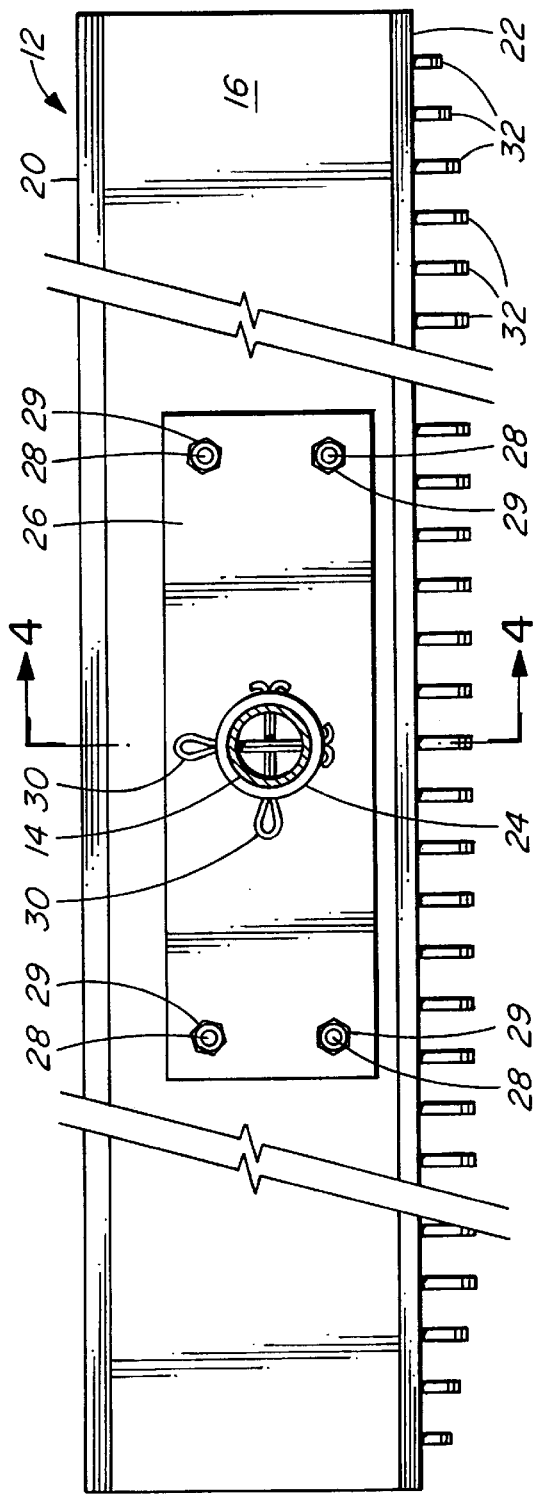
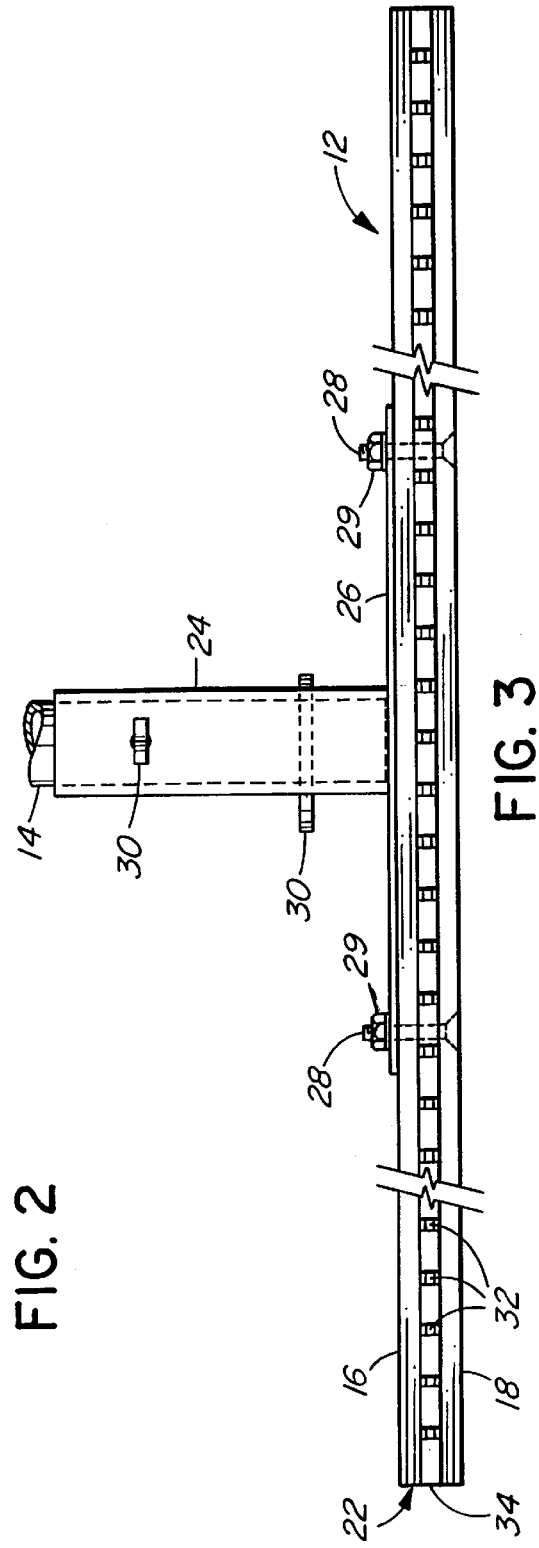
FIG. 2
FIG. 3

PLAYING FIELD GROOMING RAKE

TECHNICAL FIELD

This application relates to a durable rake specifically designed for grooming playing fields, such as baseball diamonds. The rake may be used to scarify, compact and smooth infield playing surfaces, such as base lines, pitcher's mounds and home plate areas.

BACKGROUND

Multi-purpose rakes are well-known in the prior art. For example, U.S. Pat. No. 2,317,916 granted to Kallal on Apr. 27, 1943 relates to a combined rake and hoe having a plurality of teeth projecting from one edge of the rake and a sharpened hoe edge extending along an opposite edge of the rake. While the Kallal rake is useful as a garden tool, it is not specifically adapted for grooming playing fields. In particular, the rake teeth, which are all of equal length, are relatively long and prone to bending at their tips if used to score hard clay playing field surfaces.

Conventional playing field grooming rakes currently in use are typically constructed from light weight metals such as aluminum. Aluminum rakes are not rigid enough for effective scarifying of hard clay soils. Since such rakes tend to deform over time, they are also ineffective as a tamping tool (once deformed, only a small portion of the surface area of the rake contacts the ground with each tamping blow).

The need has therefore arisen for a grooming rake which is specifically designed for maintenance of a variety of playing field surfaces.

SUMMARY OF INVENTION

In accordance with the invention, a playing field grooming rake is disclosed which includes a rigid elongated grooming member having a flat bottom surface and opposed first and second longitudinal edges. At least the first longitudinal edge is bevelled. A plurality of tines are spaced along the length of the second longitudinal edge and project outwardly therefrom. An elongated handle is securable to a top surface of the grooming member.

Preferably the tines are generally T-shaped and may be removeable. A subgroup of the tines located at end portions of the grooming member are shorter in length than the remainder of said tines to prevent snagging. In one embodiment, the second longitudinal edge of the grooming member is also bevelled.

In order to be used effectively as a light tamper, it is important that the grooming member be constructed from a relatively rigid material that will not bend or deform over time, such as maple hardwood.

BRIEF DESCRIPTION OF DRAWINGS

In drawing which illustrate the preferred embodiment of the invention, but which should not be construed as restricting the spirit or scope thereof.

FIG. 2 is an enlarged, fragmented top plan view of the rake of FIG. 1;

FIG. 3 is an enlarged, fragmented front elevational view of the rake of FIG. 1.

DESCRIPTION

Figure 1:
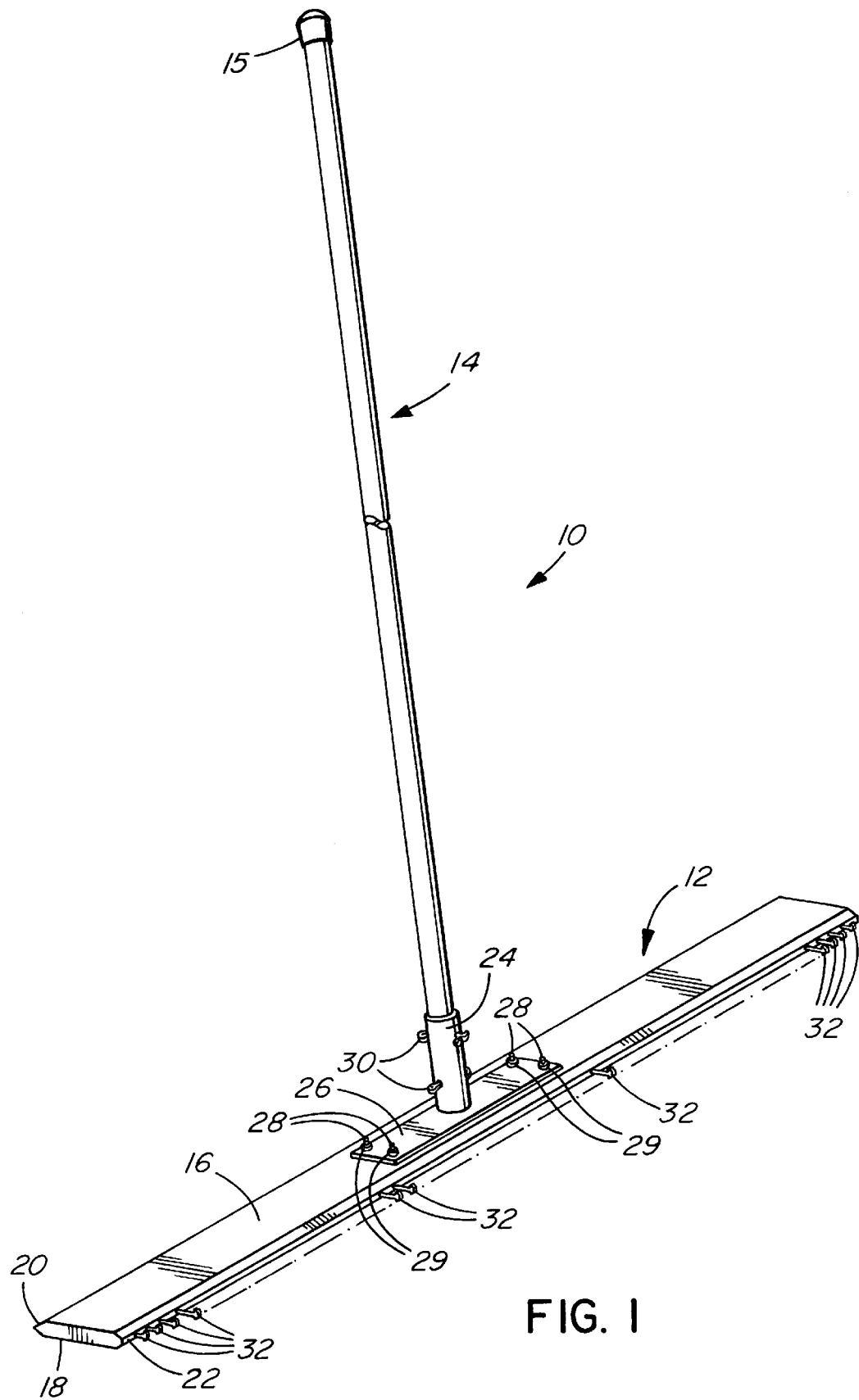
FIG. 1 is an isometric view of the applicant's playing field grooming rake.
Figure 4:
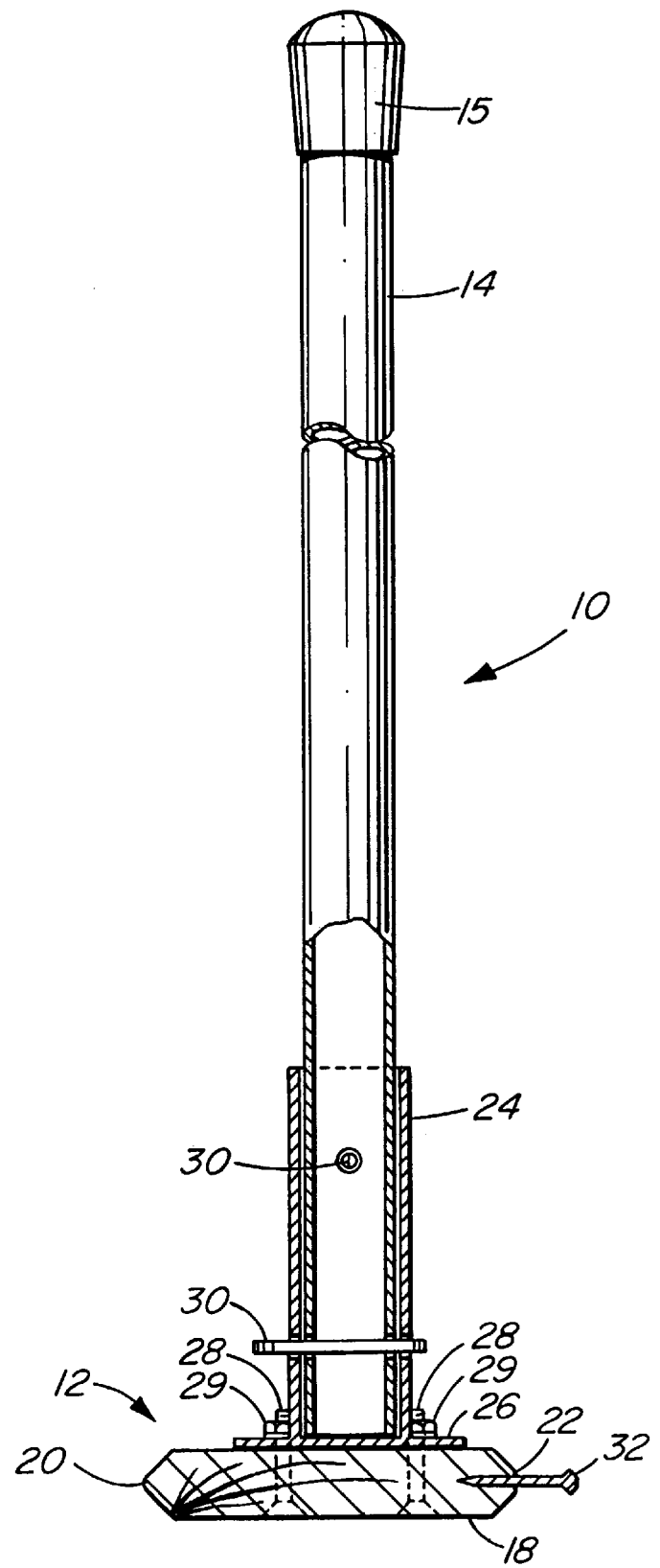
FIG. 4 is an enlarged, fragmented cross-sectional view of the rake taken along Section line 4—4 of FIG. 2 and looking in the direction of the arrows.

FIG. 1 illustrates a playing field grooming rake 10 which includes an elongated grooming member 12 and a handle 14. Grooming member 12 is generally rectangular in shape and comprises a flat upper surface 16, a flat lower surface 18 and opposed longitudinal edges 20 and 22 which are preferably bevelled. Handle 14 is removably connected to grooming member 12 by a sleeve 24. A rubber stopper 15 may be mounted at the upper end of handle 14.

Sleeve 24 is secured to a plate 26 which is mounted on a central portion of upper surface 16. For example, plate 26 may be secured to rake upper surface 16 with bolts 28 and nuts 29. Cotter pins 30 or any other suitable fasteners may be used to releasably couple handle 14 to sleeve 24.

Grooming member is preferably constructed from a rigid material which will not easily deform, such as maple hardwood. As should be apparent to someone skilled in the art, any other suitable rigid, durable material could be substituted. In a preferred embodiment, grooming member 12 is approximately 36 inches in length and ¾ inches in width.

A plurality of T-shaped grooming tines 32 are spaced along the length of longitudinal edge 22 and project outwardly therefrom. Each of the T-shaped tines comprises a shaft connected to the longitudinal edge and has a cutting element extending at an end of the shaft distal from the longitudinal edge. As best shown in FIG. 2, the tines 32 located at end portions of grooming member 12 are shorter in length than the remainder of tines 32 to prevent snagging. Tines 32 are preferably constructed from hardened steel and are mounted on a vertical facing 34 of longitudinal edge 22 (FIG. 3). In a preferred embodiment, tines 32 are approximately 1½ inches in length and project from facing 34 for a distance of approximately ⅝ inches (except for the endmost tines 32 which project for a shorter distance as discussed above). The preferred spacing between tines 32 is approximately ⅝ inches. This spacing provides optimum scarification of hardened playing field surfaces.

In use, grooming rake tines 32 may be used to scarify hard playing field surfaces, such as pitcher's mounds or home plate areas. The opposite, bevelled edge 20 may be used to smooth field surface after the dirt areas have been loosened. Rake 10 may also be used as a light weight tamper to flatten loose dirt areas. In this application, the flat bottom surface 18 of grooming member 12 is used as a press to firm and compact the playing field surface in question. Since grooming member 12 is rigid, surface 18 does not deform with repeated use but rather maintains a flat profile over its entire length.

Rake 10 may be readily maintained for optimum performance. Tines 32 may be removed, replaced, reset and realigned, if necessary. The smoothing longitudinal edge 20 may also be periodically restored and refinished using standard woodworking techniques.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A playing field grooming rake comprising:
   (a) a rigid elongated grooming member having a flat bottom surface and opposed first and second longitudinal edges, wherein at least said first edge is bevelled;
   (b) a plurality of tines spaced along the length of said second longitudinal edge and projecting outwardly therefrom wherein each of said tines is generally T-shaped and comprises a shaft connected to said second longitudinal edge and a cutting element extending at an end of said shaft distal from said second longitudinal edge; and (c) a handle securable to a top surface of said grooming member.

2. The rake as defined in claim 1, wherein a subgroup of said tines located at end portions of said grooming member are shorter in length than the remainder of said tines.

3. The rake as defined in claim 1, wherein said tines are removable.

4. The rake as defined in claim 1, wherein said second longitudinal edge is also bevelled.

5. The rake as defined in claim 1, wherein said grooming member is constructed from a hardwood.

6. The rake as defined in claim 1, wherein said cutting element comprises opposed first and second sharpened edges.

7. The rake as defined in claim 1, wherein said cutting element does not extend below the plane of said bottom surface.

8. The rake as defined in claim 1, wherein said tines are constructed from hardened steel.

9. A playing field grooming rake comprising:

(a) a rigid elongated grooming member having a flat bottom surface and opposed first and second longitudinal edges, wherein at least said first edge is bevelled; and (b) a plurality of tines spaced along the length of said second longitudinal edge and projecting outwardly therefrom, wherein a subgroup of said tines located in end portions of said grooming member are shorter in length than the remainder of said tines.

* * * * *